United States Patent
Marshall

(10) Patent No.: US 8,694,472 B2
(45) Date of Patent: *Apr. 8, 2014

(54) SYSTEM AND METHOD FOR REBUILDING INDICES FOR PARTITIONED DATABASES

(75) Inventor: Brian J. Marshall, Yorba Linda, CA (US)

(73) Assignee: CA, Inc., Islandia, NY (US)

( * ) Notice: Subject to any disclaimer, the term of this patent is extended or adjusted under 35 U.S.C. 154(b) by 895 days.

This patent is subject to a terminal disclaimer.

(21) Appl. No.: 11/686,118

(22) Filed: Mar. 14, 2007

(65) Prior Publication Data

US 2008/0228802 A1 Sep. 18, 2008

(51) Int. Cl.
 *G06F 17/00* (2006.01)
(52) U.S. Cl.
 USPC .......................................................... 707/659
(58) Field of Classification Search
 USPC .......................................................... 707/659
 See application file for complete search history.

(56) References Cited

U.S. PATENT DOCUMENTS

| | | | | |
|---|---|---|---|---|
| 4,939,689 | A | 7/1990 | Davis et al. | 364/900 |
| 5,721,915 | A | 2/1998 | Sockut et al. | 395/616 |
| 5,842,208 | A | 11/1998 | Blank et al. | 707/7 |
| 6,314,455 | B1 | 11/2001 | Cromer et al. | 709/217 |
| 6,535,893 | B1 | 3/2003 | Friske et al. | 707/204 |
| 6,820,095 | B1 * | 11/2004 | Yeung et al. | 707/200 |
| 7,035,851 | B1 * | 4/2006 | Sinclair et al. | 707/7 |
| 2001/0047360 | A1 | 11/2001 | Huras et al. | 707/102 |
| 2002/0038331 | A1 | 3/2002 | Flavin | 709/105 |
| 2003/0135478 | A1 | 7/2003 | Marshall et al. | 707/1 |
| 2003/0158869 | A1 * | 8/2003 | Micka | 707/203 |
| 2004/0215632 | A1 * | 10/2004 | Isip et al. | 707/100 |
| 2004/0236743 | A1 * | 11/2004 | Blaicher et al. | 707/7 |
| 2005/0050050 | A1 * | 3/2005 | Kawamura | 707/100 |
| 2007/0143380 | A1 * | 6/2007 | Plow et al. | 707/206 |
| 2007/0271211 | A1 * | 11/2007 | Butcher et al. | 707/1 |
| 2008/0306990 | A1 * | 12/2008 | Grosman et al. | 707/102 |

OTHER PUBLICATIONS

Patent Pending U.S. Appl. No. 11/444,030 entitled *System and Method for Online Reorganization of a Database Using Flash Image Copies* by Brian J. Marshall, 33 total pages, filed May 30, 2006.
United States Patent and Trademark Office; Office Action for U.S. Appl. No. 11/444,030, filed May 30, 2006 in the name of Brian J. Marshall; 25 pages, Apr. 17, 2008.
BMC Software; *Secondary Index Utility, General Information*; 29 pages, Nov. 17, 1997.

(Continued)

*Primary Examiner* — Ajay Bhatia
*Assistant Examiner* — Kurt Mueller
(74) *Attorney, Agent, or Firm* — Baker Botts, L.L.P.

(57) ABSTRACT

A method comprises storing a partitioned database comprising a plurality of partitions, wherein each of the plurality of partitions comprises a respective set of data records. The method continues by storing at least one secondary index associated with each of the plurality of partitions. The method continues by taking offline each of the plurality of partitions. The method continues by unloading data records from each of the plurality of partitions. The method continues by loading the data records into the partitioned database. The method continues by, in conjunction with loading the data records, modifying the at least one secondary index. The modification of the at least one secondary index comprises determining a partition identifier and a memory address associated with a particular data record loaded into the partitioned database. The modification of the at least one secondary index further comprises storing the determined partition identifier and the determined memory address in the at least one secondary index.

24 Claims, 6 Drawing Sheets

(56) References Cited

OTHER PUBLICATIONS

*Oracle8i and Oracle9i Data Reorganization and Feature Comparisons*; An Oracle White Paper; 13 pages, Mar. 2002.
IBM; *Converting Databases to HALDB Scenario*; 129 pages, Dec. 2005.
CA Data Sheet; *Unicenter Database Organizer r11.5 for IMS for z/OS*; 5 pages, 2006.
CA Data Sheet; *Unicenter Secondary Index Builder r11.5 for IMS for z/OS*; 2 pages, 2006.
IBM; *IMS Index Builder for z/OS; User's Guide*; Version 2, Release 3; SC27-0930-08; 114 pages, Apr. 2006.
CA; *New Releases of CA's Mainframe Database Management Tools for DB2 and IMS Increase Availability, Streamline Performance and Optimize Backup and Recovery*; 2 pages, May 22, 2006.
United States Patent and Trademark Office; Office Action for U.S. Appl. No. 11/444,030, filed May 30, 2006 in the name of Brian J. Marshall; 27 pages, Sep. 24, 2008.
United States Patent and Trademark Office; Office Action for U.S. Appl. No. 11/444,030, filed May 30, 2006 in the name of Brian J. Marshall; 22 pages, Aug. 17, 2009.
United States Patent and Trademark Office; Office Action for U.S. Appl. No. 11/444,030, filed May 30, 2006 in the name of Brian J. Marshall; 19 pages, Feb. 23, 2009.
USPTO; Advisory Action for U.S. Appl. No. 11/444,030, filed May 30, 2006 in the name of Brian J. Marshall; 3 pages, Oct. 28, 2009.
USPTO; Notice of Panel Decision from Pre-Appeal Brief Review for U.S. Appl. No. 11/444,030, filed May 30, 2006 in the name of Brian J. Marshall; 2 pages, Jan. 5, 2010.
USPTO; Notification of Non-Compliant Appeal Brief for U.S. Appl. No. 11/444,030, filed May 30, 2006 in the name of Brian J. Marshall; 2 pages, Mar. 3, 2010.
USPTO; Examiner's Answer for U.S. Appl. No. 11/444,030, filed May 30, 2006 in the name of Brian J. Marshall; 33 pages, Jun. 24, 2010.

\* cited by examiner

US 8,694,472 B2

SYSTEM AND METHOD FOR REBUILDING INDICES FOR PARTITIONED DATABASES

TECHNICAL FIELD OF THE INVENTION

This invention relates generally to electronic databases and more specifically to a system and method for rebuilding indices for partitioned databases.

BACKGROUND OF THE INVENTION

Database systems are widely used for storing, managing, organizing and processing data. In a database, records may be linked in a tree-like logical structure. When a transaction is performed such that data is added, updated, and/or deleted from the database, the data may become disorganized or fragmented. When data becomes disorganized or fragmented, response time to database queries may increase. As a result, it may be desirable to occasionally reorganize a database to make the database system more efficient.

Traditionally, reorganizing a database involves taking the database offline. When a database is offline, clients are unable to access and use the database. Because many databases need to be accessible all or nearly all of the time, the offline time associated with database reorganization may be undesirable.

SUMMARY OF THE INVENTION

In accordance with the present invention, the disadvantages and problems associated with traditional reorganization of a database have been substantially reduced or eliminated.

In certain embodiments, a method comprises storing a partitioned database comprising a plurality of partitions, wherein each of the plurality of partitions comprises a respective set of data records. The method continues by storing at least one secondary index associated with each of the plurality of partitions. The method continues by taking offline each of the plurality of partitions. The method continues by unloading data records from each of the plurality of partitions. The method continues by loading the data records into the partitioned database. The method continues by, in conjunction with loading the data records, modifying the at least one secondary index. The modification of the at least one secondary index comprises determining a partition identifier and a memory address associated with a particular data record loaded into the partitioned database. The modification of the at least one secondary index further comprises storing the determined partition identifier and the determined memory address in the at least one secondary index.

In some embodiments, a system comprises one or more memory modules operable to store a partitioned database. The system further comprises a processor that is communicatively coupled to the one or more memory modules and is operable to generate a copy of the partitioned database, wherein the partitioned database is associated with at least one secondary index. The processor is further operable to load data records from the copy of the partitioned database into a shadow partitioned database, the data records loaded such that the shadow partitioned database represents a reorganized version of the partitioned database. In conjunction with loading the data records into the shadow partitioned database, the processor is further operable to rebuild the at least one secondary index. The processor is further operable to replace the partitioned database with the shadow partitioned database.

The invention has several important technical advantages. Various embodiments of the invention may have none, some, or all of these disadvantages. One advantage of the present invention is that it permits the rebuilding of secondary indices for partitioned databases. By rebuilding secondary indices, database system may reduce the time and resources expended to determine the current memory locations of data records.

Another advantage of the present invention is that it streamlines the process for reorganizing partitioned databases. According to traditional methods for online reorganization, systems are required to keep track of when each data record is unloaded and when each update is received. In traditional systems, the time when an update was received must be compared with the time that the corresponding data record was unloaded in order to determine whether the update should be applied to the partitioned database or discarded. In contrast, according to certain embodiments of the present invention, processor is able to determine which updates to apply to the partitioned database without comparing the time when each update is received with the time when the corresponding data records are unloaded. Thus, the present invention conserves processing time and resources.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE DRAWINGS

Figure 1:
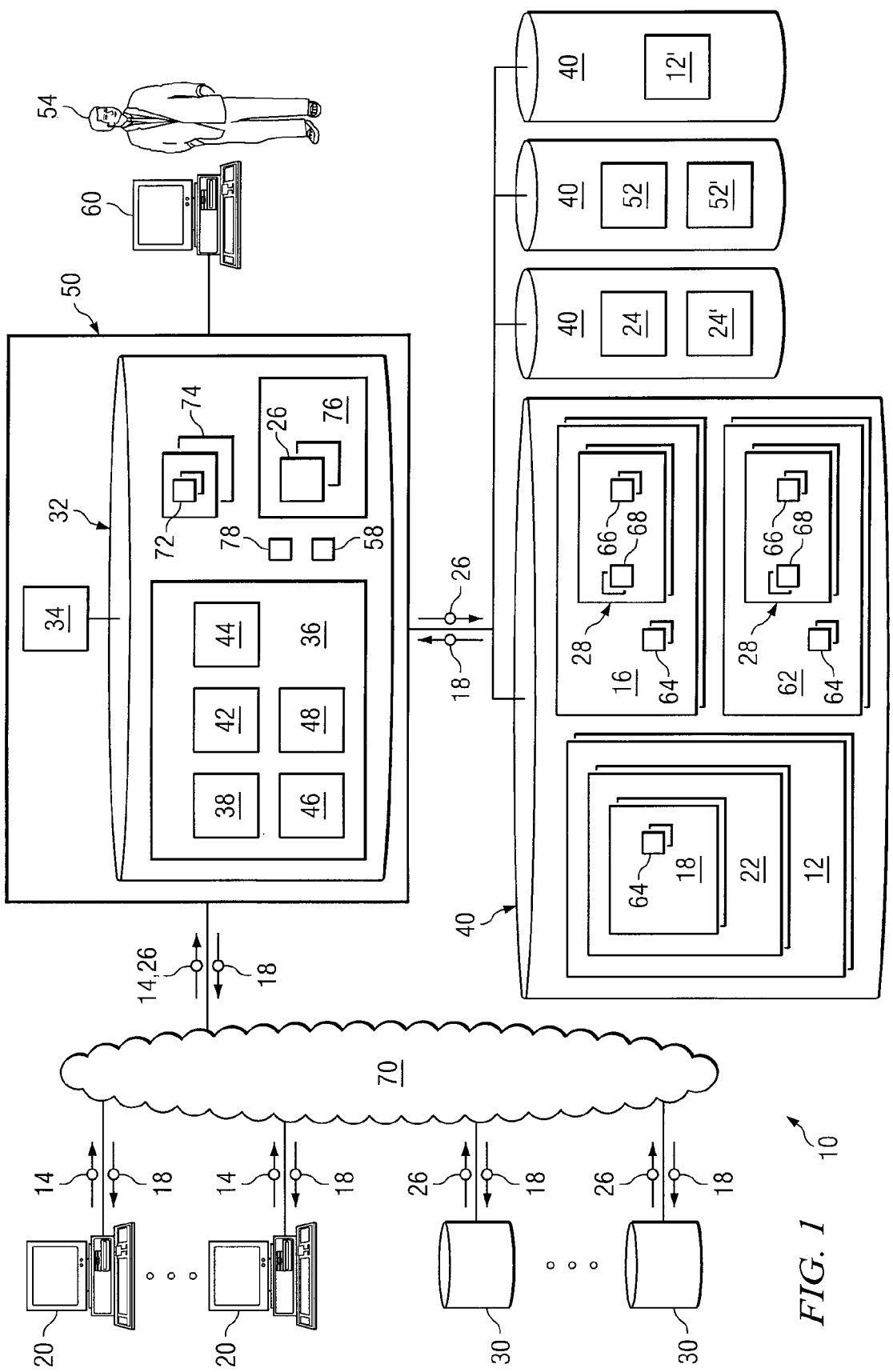
FIG. 1 illustrates a database system, according to certain embodiments.

FIG. 1 illustrates one embodiment of a database system 10 that is operable to maintain and manage one or more partitioned databases 12. In particular, database system 10 is operable to receive and respond to queries 14 for data stored in partitioned database 12. To process queries 14 and to locate data in partitioned database 12, database system 10 may use at least one secondary index 16 associated with partitioned database 12. Secondary index 16 generally references data records 18 in each partition 22 of partitioned database 12. During the course of normal use, data records 18 in one or more partitions 22 of partitioned database 12 may be moved, deleted, added, and/or updated. To reflect the changes in partitioned database 12, database system 10 may occasionally rebuild secondary index 16 associated with partitioned database 12. Rebuilding secondary index 16 may maintain and/or improve the efficiency of database system 10.

As explained above, secondary index 16 generally references data records 18 in each partition 22 of partitioned database 12. To rebuild secondary index 16, database system 10 is operable to temporarily take offline each partition 22 of partitioned database 12. In particular, database system 10 may unload and reload each partition 22 of partitioned database 12 to rebuild secondary index 16. In some embodiments, database system 10 may rebuild secondary index 16 independently of any reorganization of partitioned database 12. In other embodiments, database system 10 may rebuild secondary index 16 in conjunction with reorganizing partitioned database 12.

To reorganize partitioned database 12, database system 10 may reorganize each partition 22 of partitioned database 12 while partitioned database 12 remains online and/or accessible for responding to queries 14. In particular, database system 10 may generate and use an image copy 24 of each partition 22 to reorganize partitioned database 12. By reorganizing partitioned database 12 using image copies 24 of partitions 22, database system 10 may reduce the offline time associated with the reorganization.

As explained above, database system 10 may maintain and manage one or more partitioned databases 12. Partitioned database 12 comprises a compilation and/or grouping of data records 18. Data records 18 in partitioned database 12 may be organized and/or linked in any suitable fashion. For example, in a hierarchical database, data records 18 may be linked in a tree-like logical structure. According to certain embodiments, partitioned database 12 represents a high availability large database (HALDB). A HALDB database may comprise a partitioned hierarchic direct access method (PHDAM) database, a partitioned hierarchic indexed direct access method (PHIDAM) database, and/or any suitable partitioned database 12. Partitioned database 12 generally comprises a plurality of partitions 22.

Partition 22 refers to a subset of data records 18 in partitioned database 12. In some embodiments, each partition 22 of partitioned database 12 has the capacity of a non-partitioned database 12. According to certain embodiments, database system 10 may be operable to modify, reorganize, and/or manage a particular partition 22 of partitioned database 12 independently of one or more other partitions 22 of partitioned database 12. In particular, if a particular partition 22 of partitioned database 12 is in need of maintenance, database system 10 may take the particular partition 22 offline while permitting the remaining partitions 22 to remain online and accessible to clients 20. By providing partitioned databases 12, database system 10 may reduce offline time and increase accessibility associated with partitioned database 12.

In some embodiments, database system 10 may allow an application (e.g., computer program) to process an individual partition 22 of partitioned database 12 without processing the entire partitioned database 12. Different partitions 22 of partitioned database 12 may be processed in parallel. In some embodiments, parallel processing may be permitted in a batch environment and/or an online environment. According to certain embodiments, permitting an application to process two or more partitions 22 in parallel may reduce the amount of time involved in obtaining results for queries 14.

Database system 10 may regulate the access of a particular application to partitioned database 12. In particular, database system 10 may permit an application to access a particular partition 22 while prohibiting the application from accessing one or more other partitions 22 of partitioned database 12. In some embodiments, an application in database system 10 may sequentially process each data record 18 of partitioned database 12 regardless of the individual partitions 22 of partitioned database 12. Partitioned database may be managed by database system 10.

Database System

Database system 10 generally comprises a plurality of clients 20 and/or data sources 30, one or more memory modules 40, a manager server 50, and an operator console 60 communicatively coupled by one or more networks 70.

Client 20 is communicatively coupled to manager server 50 via network 70. Client 20 is operable to transmit queries 14 and/or updates 26 to manager server 50. Client 20 may represent any suitable device for transmitting and/or receiving electronic communications. Client 20 may represent a computer, work station, electronic notebook, mobile phone, handheld device, personal data assistant (PDA), pager, mini computer, or other device capable of wireless and/or wireline communications. It will be understood that there may be any number and combination of clients 20 in database system 10.

Client 20 is operable to transmit to manager server 50 one or more updates 26 associated with partitioned database 12. Update 26 refers to a change to, addition to, deletion of, and/or modification of data in partitioned database 12. Update 26 may be submitted to partitioned database 12 from data source 30, client 20, operator console 60, and/or any other suitable node external and/or internal to database system 10.

Data source 30 is communicatively coupled to manager server 50 via network 70. Data source 30 represents a data feed, memory, data network, and/or any other suitable number and combination of informational sources. Data source 30 is operable to transmit to manager server 50 updates 26 related to partitioned databases 12 in memory modules 40. Data source 30 may represent a computer, work station, electronic notebook, mobile phone, handheld device, personal data assistant (PDA), pager, mini computer, or other device capable of wireless and/or wireline communications. It will be understood that there may be any number and combination of data sources 30 in database system 10.

Database system 10 comprises manager server 50. Manager server 50 is generally operable to manage and maintain one or more partitioned databases 12 in memory modules 40. In particular, manager server 50 is operable to receive queries 14 from clients 20 and to determine the particular data records 18 in partitioned database 12 that satisfies queries 14. Manager server 50 is further operable to receive updates 26 to partitioned databases 12 from clients 20 and/or data sources 30 and to change the partitioned databases 12 according to updates 26.

During the course of normal use, partitioned database 12 may become disorganized. As a result, one or more partitions 22 of partitioned database 12 may need to be reorganized to become more efficient. Reorganization refers to the process of restructuring, reorganizing, and/or rebuilding one or more partitions 22 of partitioned database 12 to improve the speed and/or efficiency of database system 10. Reorganization of partition 22 may comprise unloading partition 22 (i.e., removing data), clustering data, ordering data, inserting data, deleting data, and/or reloading partition 22. Manager server 50 is operable to reorganize partition 22 by generating image copy 24 of partition 22. Using image copies 24 of partitions 22, manager server 50 may generate and organize a shadow database 12' that represents a reorganized version of the original partitioned database 12. By using image copy 24 to generate shadow database 12', manager server 50 is operable to eliminate or reduce the amount of time that one or more partitions 22 of partitioned database 12 are offline during reorganization. Reducing offline time is especially desirable for partitioned databases 12 that are used by clients 20 substantially all the time.

Manager server 50 is further operable to rebuild secondary indices 16 associated with partitioned database 12. During reorganization and/or normal use of partitioned database 12, the memory locations 28 of data records 18 may change. Accordingly, manager server 50 is operable to rebuild secondary indices 16 to indicate the new memory locations 28 of data records 18 in partitioned database 12. (Secondary indices 16 are described further with respect to FIG. 2.)

Manager server 50 may comprise a general-purpose personal computer (PC), a Macintosh, a workstation, a Unix-based computer, a server computer, or any suitable processing device. Manager server 50 may include any hardware, software, firmware, or combination thereof operable to perform the above operations and functions. To make system 10 more robust, manager server 50 may be associated with a redundant manager server 50 which is operable to assume substantially all of the functionality of manager server 50 in the event of a failure. Although FIG. 1 provides one example of manager server 50 that may be used with the invention, system 10 can be implemented using computers other than servers, as well as a server pool.

Manager server 50 comprises a manager memory 32 and a processor 34. Manager memory 32 comprises logic 36 that, when executed, is operable to manage partitioned databases 12, process queries 14, apply updates 26 to partitioned databases 12, reorganize partitioned databases 12, and/or rebuild secondary indices 16. Manager memory 32 is communicatively coupled to processor 34. Processor 34 is operable to execute logic 36 to perform the described functions and operations.

Logic 36 in manager memory 32 comprises instructions for reorganizing partitioned databases 12. Logic 36 may comprise a plurality of modules for managing the reorganization process. In particular, logic 36 may comprise a call intercept module 38, call replay module 42, secondary index builder module 44, database image copier module 46, and database organizer module 48. By executing the modules in logic 36, processor 34 is operable to reorganize partitioned database 12 while reducing the offline time associated with the reorganization. (The modules in logic 36 are described further with respect to FIG. 3.)

Manager server 50 may be communicatively coupled to a plurality of memory modules 40. Memory modules 40 are generally operable to store partitioned databases 12 and other information associated with database system 10. Memory module 40 may represent any memory device, direct access storage device (DASD), or database module and may take the form of volatile or non-volatile memory comprising, without limitation, magnetic media, optical media, random access memory (RAM), read-only memory (ROM), removable media, or any other suitable local or remote memory component. Memory module 40 may store partitioned databases 12, indices associated with partitioned databases 12, shadow databases 12', image copies 24, and physical image copies of partitioned databases 12. It will be understood that there may be any suitable number and combination of memory modules 40 communicatively coupled to manager server 50.

Manager server 50 may be communicatively coupled to operator console 60. Operator console 60 may represent any suitable device for transmitting and/or receiving electronic communications. Operator console 60 may represent a computer, work station, electronic notebook, mobile phone, handheld device, personal data assistant (PDA), pager, mini computer, or other device capable of wireless and/or wireline communications. It will be understood that there may be any number and combination of operator consoles 60 in database system 10.

Operator 54 may be a person, computer, machine, and/or any other suitable entity that monitors, controls, and/or maintains database system 10. According to certain embodiments, operator 54 may be a system administrator associated with database system 10. It will be understood that there may be any number and combination of operators 54 associated with database system 10.

Clients 20, data sources 30, manager server 50, memory modules 40, and operator console 60 may be communicatively coupled via one or more networks 70. Network 70 may represent any number and combination of wireline and/or wireless networks suitable for data transmission. Network 70 may, for example, communicate internet protocol packets, frame relay frames, asynchronous transfer mode cells, and/or other suitable information between network addresses. Network 70 may include one or more intranets, local area networks, metropolitan area networks, wide area networks, cellular networks, all or a portion of the Internet, and/or any other communication system or systems at one or more locations.

Partitioned Databases and Secondary Indices

Figure 2:
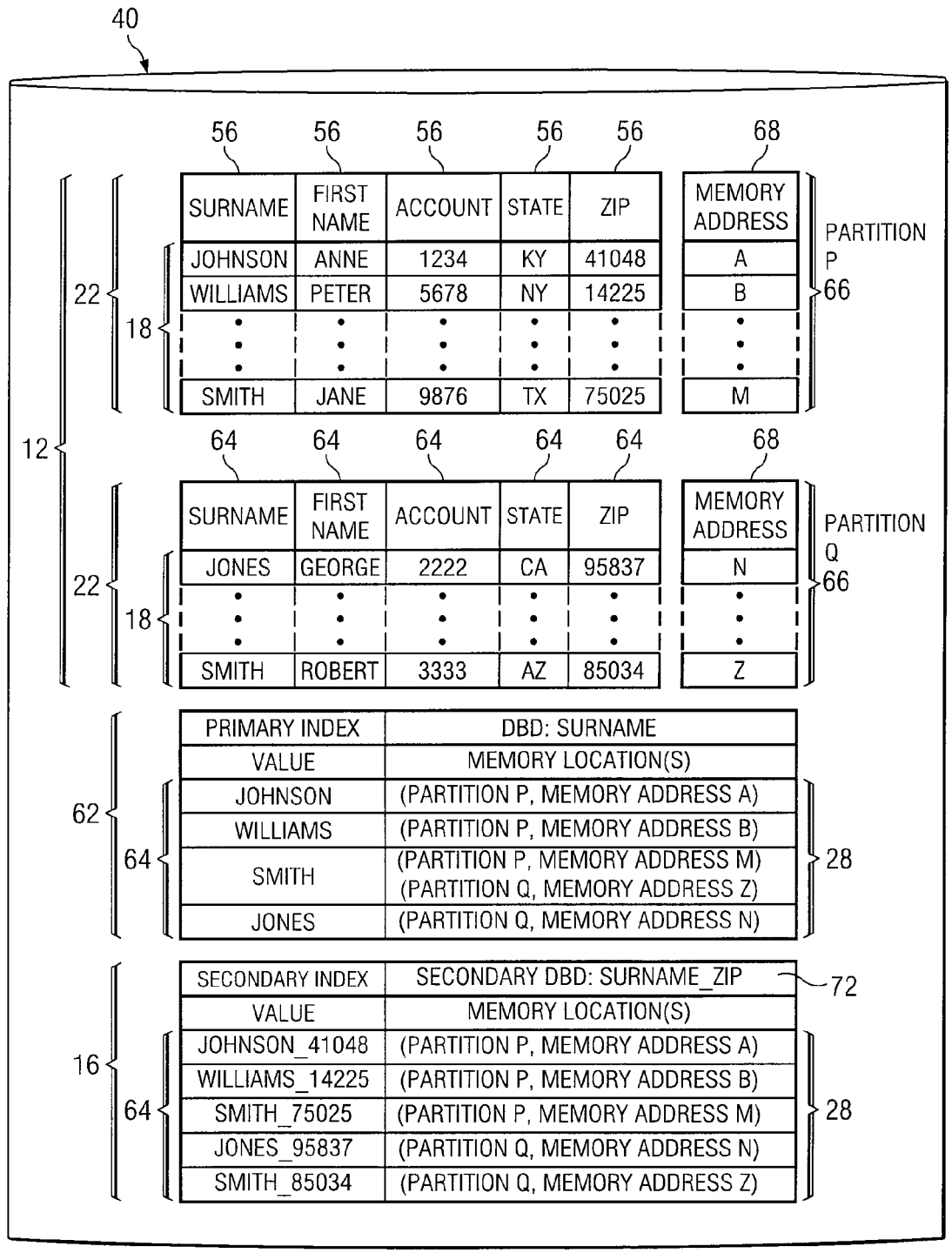
FIG. 2 illustrates partitions and indices associated with an example partitioned database, according to certain embodiments.

FIG. 2 illustrates example partitions 22 and indices, according to certain embodiments. As explained above, each partition 22 in partitioned database 12 comprises a respective subset of data records 18. A particular data record 18 may comprise one or more fields 56 of data. Each field 56 of data record 18 may comprise a different data type. For example, a first field 56 of data record 18 may comprise a last name, a second field 56 of data record 18 may comprise a first name, a third field 56 of data record 18 may comprise an account number, and so forth. It should be understood that field 56 may be associated with any number and combination of suitable data types. Each field 56 in data record 18 may be associated with a respective database definition (DBD). For example, a DBD for field 56 that comprises an account number may be ACCOUNT, a DBD for field 56 that comprises a last name may be SURNAME, and so forth. Although the terms ACCOUNT and SURNAME are used in this example, it should be understood that a particular field 56 may be associated with any suitable DBD. DBDs associated with fields 56 of data records 18 in partitioned database 12 may be stored in a DBD file 58 in manager memory 32 and/or memory modules 40.

Database system 10 is operable to search partitioned database 12 in response to queries 14 from clients 20. Query 14 refers to a request for particular data stored in partitioned database 12. Query 14 may be based on any field 56 or combination of fields 56 associated with data records 18 in partitioned database 12. Query 14 may comprise one or more search terms coupled by any suitable number and combination of logical connectors.

Database system 10 may use fields 56 to locate, retrieve, add, modify, and/or otherwise manage information in partitioned database 12. In particular, memory module 40 may comprise primary index 62 associated with a particular partitioned database 12 and a particular field 56. For each data record 18 in partitioned database 12, primary index 62 may comprise (1) a respective field value 64 corresponding to the particular field 56 and (2) a memory location 28 for that data record 18. Memory location 28 refers to the location in memory module 40 where database system 10 may find a particular data record 18. Memory location 28 may comprise a partition identifier 66 and a memory address 68.

Partition identifier 66 may be a unique set of numerals, symbols, and/or any suitable number and combination of characters. Each partition 22 in partitioned database 12 may be associated with a respective partition identifier 66. In some embodiments, partition identifier 66 for a particular partition 22 may comprise a name or term that is descriptive of the particular data records 18 in the particular partition 22. For example, if a particular partition 22 comprises data records 18 "001" to "100" of Partitioned Database X, partition identifier 66 for the particular partition 22 may be "×100." In some embodiments, partition identifier 66 may be associated with a partition definition. Partition definition for a particular partition 22 may define the subset of data records 18 in partitioned database 12 that are comprised in the particular partition 22. In some embodiments, partition definitions may be configured at the time partitioned database 12 is initialized.

In addition, or alternatively, to comprising partition identifier 66, memory location 28 may comprise memory address 68. Memory address 68 refers to the location of a particular data record 18 in a particular partition 22. Thus, after using partition identifier 66 in memory location 28 to identify the appropriate partition 22, database system 10 may use memory address 68 in memory location 28 to locate the requested data record 18 within the identified partition 22. Memory address 68 may represent a unique identifier for a space in memory module 40 at which a CPU or other device can store and/or locate a piece of data. Memory address 68 may point to one or more bytes of storage.

An example illustrates particular embodiments. In this example, partitioned database 12 comprises at least two partitions 22—Partition P and Partition Q. Each partition 22 comprises a plurality of data records 18. Each data record 18 comprises a surname field 56, a first name field 56, an account field 56, a state field 56, and a zip code field 56. In this example, database system 10 comprises a particular primary index 62 associated with the surname field 56. In particular, for each surname in partitioned database 12, primary index 62 indicates one or more memory locations 28. Each memory location 28 comprises a partition identifier 66 and memory address 68 where the corresponding data record(s) 18 may be found. In this example (illustrated in FIG. 2), primary index 62 stores the surname "Johnson" in association with Partition Identifier P and Memory Address A. Thus, in response to query 14 based on the surname of "Johnson," database system 10 may use primary index 62 to locate in partitioned database 12 the particular data record(s) 18 that satisfy the query 14. In this example, partitioned database 12 comprises entries for two different individuals with the surname of "Smith." Accordingly, in primary index 62, the surname of "Smith" is associated with two different memory locations 28.

In the foregoing example, partitioned database 12 is associated with primary index 62 that is based at least in part on the surname field 56. It should be understood, however, that partitioned database 12 may be associated with any number and combination of primary indices 62. For example, partitioned database 12 may be associated with a plurality of primary indices 62 wherein each primary index 62 corresponds to a respective field 56 of data record 18.

As shown in the foregoing example, primary index 62 may facilitate the retrieval of data records 18 based on a particular field value 64 for a particular field 56. In a large partitioned database 12, a search based on a single field 56 may return numerous results. As an example, a large partitioned database 12 may comprise data records 18 for hundreds of individuals with the surname of "Smith." If a user of database system 10 is searching for specific individuals, a search based on primary index 62 associated with the surname field 56 may return numerous unwanted results.

Accordingly, database system 10 may comprise one or more secondary indices 16. Secondary index 16 may allow data records 18 to be located based at least in part on a portion of field value 64 or on a combination of multiple field values 64 associated with different fields 56. For example, secondary index 16 may facilitate the processing of query 14 based on the combination of a surname and a zip code. To generate secondary index 16, database system 10 may define a secondary DBD 72. A particular secondary DBD 72 generally identifies the data type(s) associated with a corresponding secondary index 16. For example, for secondary index 16 based on the combination of surname values and zip codes, database system 10 may generate secondary DBD 72 of "SURNAME_ZIP." Database system 10 may then scan partitioned database 12 and determine a SURNAME_ZIP field value 64 for each data record 18 in partitioned database 12. For example, for data record 18 associated with Jane Smith, database system 10 may determine field value 64 of "Smith_75025." Database system 10 may then store in secondary index 16 an entry comprising the determined field value 64 of "Smith_75025" in association with memory location 28 comprising Partition Identifier P and Memory Address M. To populate secondary index 16, database system 10 may repeat this process for each data record 18 in partitioned database 12. Thus, for each data record 18 in partitioned database 12, secondary index 16 may comprise (1) a respective field value 64 corresponding to the particular secondary DBD 72 and (2) a memory location 28 for that data record 18. In this example, if database system 10 subsequently receives query 14 for data records 18 associated with a particular surname and a particular zip code, database system 10 may use secondary index 16 to locate in partitioned database 12 the requested data records 18.

According to certain embodiments, database system 10 may operate more efficiently by using secondary indices 16. For example, for partitioned database 12 comprising data records 18 for multiple "Smiths," a search that uses secondary index 16 associated with secondary DBD 72 of "SURNAME_ZIP" may return fewer unwanted results that search that uses primary index 62 associated with a DBD of "SURNAME."

As explained above, database system 10 generates a particular secondary DBD 72 in conjunction with generating secondary index 16. Secondary DBDs 72 may be stored in a secondary DBD file 74 in manager memory 32 and/or memory module 40. In the foregoing example, database system 10 generates secondary DBD 72 of "SURNAME_ZIP." It should be understood, however, that secondary DBD 72 may be associated with any number and combination of data types.

In the foregoing example, secondary index 16 is associated with a combination of fields 56 (e.g., surname and zip code). It should be understood that secondary index 16 may be associated with a portion of a single field 56. For example, database system 10 may generate secondary index 16 based on the first three letters of an individual's last name. According to certain embodiments, such secondary index 16 may be used to broaden the results of a search. Thus, it should be understood that secondary index 16 may be associated with any number, portion, and/or combination of suitable fields 56.

Rebuilding Secondary Indices in Conjunction with Database Reorganization

In operation, database system 10 is operable to rebuild secondary index 16 associated with partitioned database 12 in conjunction with reorganizing partitioned database 12. Because secondary index 16 may reference all or multiple partitions 22 of partitioned database 12, database system 10 is operable to reorganize, at substantially the same time, all or multiple partitions 22 of partitioned database 12.

According to certain embodiments, database system 10 may reorganize partitioned database 12 while that partitioned database 12 remains online and accessible for responding to queries 14 from clients 20. In particular, processor 34 may receive a command to reorganize a particular partitioned database 12. In response, processor 34 may temporarily take offline each partition 22 of partitioned database 12. Processor 34 may then use memory module 40 to generate image copy 24 of partitioned database 12. Image copy 24 represents a replica of partitioned database 12. According to certain embodiments, image copy 24 may be a flash image copy of partitioned database 12 that is generated by copying partitioned database 12 byte by byte. Processor 34 may store image copy 24 of partitioned database 12 in the same memory module(s) 40 as the original partitioned database 12. In other embodiments, image copy 24 may be stored in one or more different memory modules 40.

When processor 34 receives the command to reorganize partitioned database 12, processor 34 may begin to intercept updates 26 to partitioned database 12 from clients 20 and/or data sources 30. Processor 34 may store the intercepted updates 26 in manager memory 32 and/or any number and combination of memory modules 40. According to certain embodiments, the portion of manager memory 32 and/or memory module(s) 40 used for storing intercepted updates 26 is referred to as call intercept memory 76.

Once image copy 24 of the particular partitioned database 12 is complete, processor 34 may place each partition 22 of partitioned database 12 back online. When partitioned database 12 is online, partitioned database 12 is available for responding to queries 14 submitted by clients 20.

After processor 34 generates image copy 24 of partitioned database 12, processor 34 may use image copy 24 to generate physical image copy 52 of partitioned database 12. Physical image copy 52 refers to a physical copy of partitioned database 12. In some embodiments, blocks of partitioned database 12 may be arranged sequentially in physical image copy 52. In physical image copy 52, each block of partitioned database 12 may be associated with a header segment. Processor 34 may store physical image copy 52 in any number and combination of memory modules 40 communicatively coupled to manager server 50.

Once physical image copy 52 of partitioned database 12 is complete, processor 34 may use image copy 24 and/or physical image copy 52 to generate shadow database 12' of partitioned database 12. To generate shadow database 12', processor 34 may copy and/or reorganize the data in image copy 24 and/or physical image copy 52. In particular, processor 34 may reorganize data records 18 from image copy 24 and/or physical image copy 52 to make shadow database 12' a more efficient and/or organized version of the original partitioned database 12. Thus, shadow database 12' represents a reorganized copy of the original partitioned database 12. Processor 34 may store shadow database 12' in any number and combination of memory modules 40.

In some embodiments, reorganizing data in image copy 24 to generate shadow database 12' may comprise restructuring partitions 22. In particular, processor 34 may redefine partition identifiers 66 and/or partition definitions such that shadow database 12' is a more efficient and/or organized version of the original partitioned database 12. The redefined partition identifiers 66 and/or partition definitions may be stored in one or more memory modules 40.

In conjunction with generating shadow database 12', processor 34 may rebuild one or more secondary indices 16 associated with the original partitioned database 12 to correspond to the reorganized structure of shadow database 12'. In particular, as each partition 22 of shadow database 12' is populated with data records 18, processor 34 may determine from shadow database 12' the new memory location 28 associated with each data record 18. The new memory location 28 may comprise a partition identifier 66 and a memory address 68. Processor 34 may store the determined partition identifier 66 and memory address 68 in the rebuilt secondary index 16.

In some embodiments, processor 34 may verify or determine one or more field values 64 in conjunction with rebuilding secondary index 16. For example, assume processor 34 rebuilds secondary index 16 associated with secondary DBD 72 of "SURNAME_ZIP." As each partition 22 of shadow database 12' is populated with data records 18, processor 34 may determine, for each data record 18, a SURNAME_ZIP field value 64 by combining field value 64 of the surname field 56 with field value 64 of the zip code field 56 from that data record 18. Processor 34 may store the SURNAME_ZIP field value 64 in secondary index 16 in conjunction with the new memory location 28 associated with that data record 18. Processor 34 may rebuild a respective secondary index 16 for each secondary DBD 72 in secondary DBD file 74. Processor 34 may store the one or more rebuilt secondary indices 16 in any number and combination of memory modules 40.

Throughout the reorganization process, processor 34 continues to intercept updates 26 to the original partitioned database 12 from clients 20 and/or data sources 30. Processor 34 stores the intercepted updates 26 in call intercept memory 76. After generating shadow database 12', processor 34 may transfer the intercepted updates 26 from call intercept memory 76 to shadow database 12'. The step of transferring the intercepted updates 26 to shadow database 12' may be referred to as "call replay." Processor 34 is operable to determine an appropriate location in shadow database 12' to apply each intercepted update 26. For example, if an intercepted update 26 corresponds to a particular data record 18 in shadow database 12', processor 34 is operable to identify in shadow database 12' a space that corresponds to or is near to the particular data record 18. Processor 34 may then apply the intercepted update 26 to the identified space in shadow database 12'.

After replaying intercepted updates 26 to shadow database 12', processor 34 may take the original partitioned database 12 offline. Subsequently, processor 34 may initiate a second call replay. In particular, processor 34 may replay to shadow database 12' all updates 26 in call intercept memory 76 that processor 34 intercepted since the first call replay. This second call replay may help ensure that all updates 26 received since the beginning of the reorganization process are applied to shadow database 12'.

After the second call replay, processor 34 may register shadow database 12' with manager memory 32 in manager server 50. Some database systems 10 may require that the reorganized partitioned database 12 have the same name as the original partitioned database 12. Accordingly, processor 34 may swap the naming convention of the original partitioned database 12 with that of shadow database 12'. By registering shadow database 12' with manager memory 32 in manager server 50, processor 34 may activate shadow database 12' in place of the original partitioned database 12.

After the second call replay, processor 34 may use memory module 40 to create image copy 24' of shadow database 12'. (Image copy of shadow database 12' is designated in FIG. 1 as 24'.) Processor 34 may store image copy 24' of shadow database 12' in any number and combination of memory modules 40. Database system 10 may use image copy 24' of shadow database 12' to recover or repair shadow database 12' in the event shadow database 12' becomes damaged.

After registering shadow database 12' with manager memory 32, processor 34 may place shadow database 12' online. Shadow database 12' represents a reorganized version of the original partitioned database 12. Shadow database 12' may comprise multiple partitions 22 and may comprise updates 26 from clients 20 submitted during the reorganization process. Because shadow database 12' is a reorganized version of the original partitioned database 12, shadow database 12' may enable database system 10 to more quickly and efficiently process queries 14 from clients 20.

After shadow database 12' is placed back online, processor 34 may use image copy 24' of shadow database 12' to generate physical image copy 52' of shadow database 12'. (Physical image copy of shadow database 12' is designated in FIG. 1 as 52'.) Physical image copy 52' of shadow database 12' may be registered with manager memory 32 for recovery purposes. If database system 10 is operable to use image copy 24' of shadow database 12' for recovery purposes, it may not be necessary to create physical image copy 52' of shadow database 12'.

According to certain embodiments, manager memory 32 may comprise a database recovery control (DBRC) module 78. DBRC module 78 comprises logic or instructions for recovering and/or repairing a particular partitioned database 12 if that partitioned database 12 is damaged, deleted, destroyed, or otherwise modified. Upon executing DBRC module 78, processor 34 may use image copy 24' and/or physical image copy 52' to recover shadow database 12' if shadow database 12' becomes damaged. Although DBRC module 78 is illustrated as residing in manager memory 32, it should be understood that DBRC module 78 may, additionally or alternatively, reside in any number and combination of memory modules 40.

As described above, database system 10 is operable to reorganize a particular partitioned database 12 using image copy 24 of that partitioned database 12. Moreover, database system 10 is operable to intercept from clients 20 updates 26 to the partitioned database 12 during the reorganization of partitioned database 12. By replaying the intercepted updates 26 to shadow database 12', database system 10 may ensure that shadow database 12' comprises updates 26 submitted during the reorganization process. Database system 10 simplifies the reorganization of a particular partitioned database 12 by intercepting updates 26 as soon as the reorganization process begins. Determining which updates 26 to apply to shadow database 12' is simplified because database system 10 may apply all intercepted updates 26 that correspond to the particular partitioned database 12. Manager server 50 is not required to track timestamps associated with individual updates 26 to determine, on an update-by-update basis, whether to apply a particular update 26 to the reorganized shadow database 12'. Thus, database system 10 may conserve processing time and resources by simplifying the determination of which updates 26 to apply to shadow database 12'.

At a given time, manager server 50 may receive from clients 20 updates 26 for multiple different partitioned databases 12 in memory modules 40. Manager server 50 is operable to determine which updates 26 correspond to which partitioned databases 12. Moreover, manager server 50 is operable to determine whether a particular update 26 corresponds to a particular partitioned database 12 that is currently being reorganized. Manager server 50 is operable to reorganize multiple partitioned databases 12 simultaneously and to maintain in manager memory 32 a list of partitioned databases 12 currently being reorganized. Upon receiving a particular update 26, processor 34 may scan the update 26 to identify the particular partitioned database(s) 12 to which that update 26 applies. Processor 34 may then scan a list of partitioned databases 12 currently being reorganized to determine whether the identified partitioned database(s) 12 are currently being reorganized. If processor 34 determines that the identified partitioned database(s) 12 are currently being reorganized, processor 34 may intercept and store that update 26 in call intercept memory 76. If processor 34 determines that the identified partitioned database(s) 12 are not currently being reorganized, processor 34 may apply that update 26 to the identified partitioned database(s) 12 in memory module 40. The intercepted updates 26 in call intercept memory 76 may be segregated according to the particular partitioned databases 12 to which the intercepted updates 26 apply. Thus, processor 34 may identify and replay to a particular partitioned database 12 those intercepted updates 26 that apply to that partitioned database 12. Because the intercepted updates 26 are segregated according to the corresponding partitioned databases 12, processor 34 may avoid replaying to a particular partitioned database 12 intercepted updates 26 that do not apply to that partitioned database 12.

Logic Modules

Logic 36 in manager memory 32 comprises instructions that, when executed, may direct processor 34 in manager server 50 to reorganize a particular partitioned database 12 and to rebuild secondary indices 16. In some embodiments, logic 36 may comprise multiple logic 36 modules, wherein each logic 36 module applies to a particular aspect of the reorganization process. In particular, logic 36 may comprise a call intercept module 38, call replay module 42, secondary index builder module 44, database image copier module 46, and database organizer module 48. By executing the modules in logic 36, processor 34 is operable to reorganize partitioned database 12 while reducing the offline time associated with the reorganization.

Figure 3:
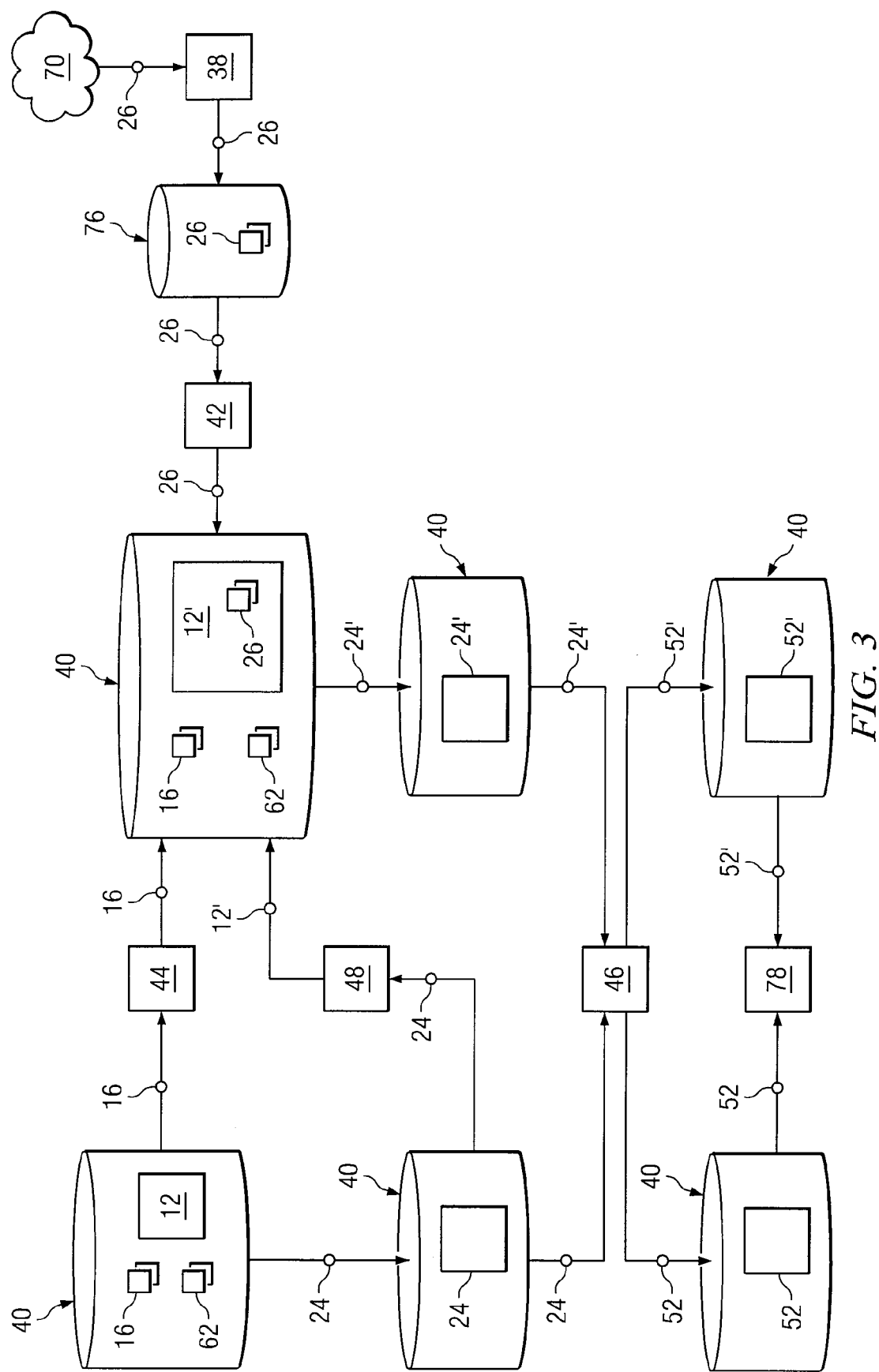
FIG. 3 illustrates a flow of operation among various components of the database system illustrated in FIG. 1, according to certain embodiments.

FIG. 3 illustrates a flow of operation among the logic modules associated with logic 36. When manager server 50 receives a command to reorganize a particular partitioned database 12, call intercept module 38 may begin to intercept updates 26 to the particular partitioned database 12 from clients 20 and/or data sources 30. The intercepted updates 26 may be stored in call intercept memory 76. At the start of the reorganization process, processor 34 may take each of the partitions 22 of partitioned database 12 offline. Processor 34 may use memory module 40 to generate image copy 24 of the particular partitioned database 12. According to certain embodiments, image copy 24 of partitioned database 12 may be a flash image copy that represents a replica of each partition 22 of partitioned database 12. Processor 34 may then place each partition 22 of partitioned database 12 back online.

Once image copy 24 of partitioned database 12 is complete, database image copier module 46 may use image copy 24 to generate physical image copy 52 of partitioned database 12. Physical image copy 52 of partitioned database 12 represents a copy wherein each block of partitioned database 12 is associated with a header segment and each block of the partitioned database 12 is arranged sequentially. Physical image copy 52 may be stored in memory module 40. According to certain embodiments, if a particular partitioned database 12 is damaged, DBRC module 78 may use physical image copy 52 of the particular partitioned database 12 to recover the particular partitioned database 12. In other embodiments, DBRC module 78 may use image copy 24 rather than physical image copy 52 for recovery of partitioned database 12. Processor 34 may store image copy 24 and/or physical image copy 52 of partitioned database 12 in any suitable number and combination of memory modules 40.

Once image copy 24 and/or physical image copy 52 of partitioned database 12 is complete, database organizer module 48 may use image copy 24 and/or physical image copy 52 to reorganize partitioned database 12 into shadow database 12'. Generating shadow database 12' may comprise unloading data from image copy 24 and/or physical image copy 52 and organizing (reloading) that data into shadow database 12'. In generating shadow database 12', database organizer module 48 may copy and/or reorganize the data in image copy 24 and/or physical image copy 52. Shadow database 12' may comprise any number and combination of partitions 22. Shadow database 12' may be stored in any suitable number and combination of memory modules 40.

In conjunction with generating shadow database 12', processor 34 may rebuild one or more secondary indices 16 associated with the original partitioned database 12 to correspond to the reorganized structure of shadow database 12'. As data record 18 is loaded from image copy 24 and/or physical image copy 52 into shadow database 12', processor 34 may determine from shadow database 12' the new memory location 28 associated with each data record 18. The new memory location 28 may comprise a partition identifier 66 and a memory address 68. Processor 34 may store the determined partition identifier 66 and memory address 68 in the rebuilt secondary index 16.

Call replay module 42 may then begin applying intercepted updates 26 to shadow database 12'. In particular, call replay module 42 may retrieve from call intercept memory 76 the intercepted updates 26 received from clients 20 and/or data sources 30 since the start of the reorganization of partitioned database 12. Call replay module 42 may then replay or apply the intercepted updates 26 to shadow database 12'. Call replay module 42 is operable to determine an appropriate location in shadow database 12' for each intercepted update 26. In particular, for an intercepted update 26 related to a particular data record 18, call replay module 42 is operable to identify in shadow database 12' a space that corresponds to or is near to the particular data record 18. Call replay module 42 may apply the intercepted update 26 to that identified space. Call replay module 42 may notify processor 34 when all of the intercepted updates 26 have been transmitted to shadow database 12'. Processor 34 may then, once again, take offline each partition 22 of partitioned database 12.

Because replaying intercepted updates 26 to shadow database 12' may not be instantaneous, it is possible for call intercept module 38 to intercept additional updates 26 during the call replay. Thus, to ensure that all intercepted updates 26 are applied to shadow database 12', manager server 50 may repeat the call replay procedure. Accordingly, call replay module 42 may retrieve from call intercept module 38 any additional intercepted updates 26. Call replay module 42 may then replay the additional intercepted updates 26 to shadow database 12'. This second phase of replaying intercepted updates 26 to shadow database 12' may ensure that all updates 26 received since the beginning of the reorganization process are applied to shadow database 12'. It should be understood that the call replay procedure may be repeated any number of times to ensure that all intercepted updates 26 are applied to shadow database 12'. Once the intercepted updates 26 are applied to shadow database 12', processor 34 may register shadow database 12' in manager memory 32. Registration of shadow database 12' may comprise swapping the naming convention of the shadow database 12' with that of the original partitioned database 12.

Once shadow database 12' is registered, processor 34 may use memory module 40 to create image copy 24' of shadow database 12'. Image copy 24' of shadow database 12' may be stored in memory module 40 and used for recovery of shadow database 12' if the shadow database 12' becomes damaged. After the creation of the image copy 24' of shadow database 12', processor 34 places shadow database 12' online in place of the original partitioned database 12. Shadow database 12' may then be used to respond to queries 14 submitted by clients 20. Because shadow database 12' is a reorganized version of the original partitioned database 12, shadow database 12' may enable database system 10 to operate more efficiently.

In some embodiments, once image copy 24' of shadow database 12' is complete, database image copier module 46 may use that image copy 24' to generate physical image copy 52' of shadow database 12'. Physical image copy 52' of shadow database 12' may be stored in memory module 40 for purposes of recovery. Should shadow database 12' experience problems, physical image copy 52' of shadow database 12' may be used to recover from the problems. In some embodiments, database system 10 may be operable to use image copy 24' for recovery purposes. The process of recovering partitioned database 12 by means of image copy 24' may be referred to as forward recovery. If a particular database system 10 is configured to conduct forward recovery of damaged partitioned databases 12, then it may not be necessary for database image copier module 46 to generate physical image copy 52' of shadow database 12'.

Rebuilding Secondary Indices Independently of Database Reorganization

Figure 4:
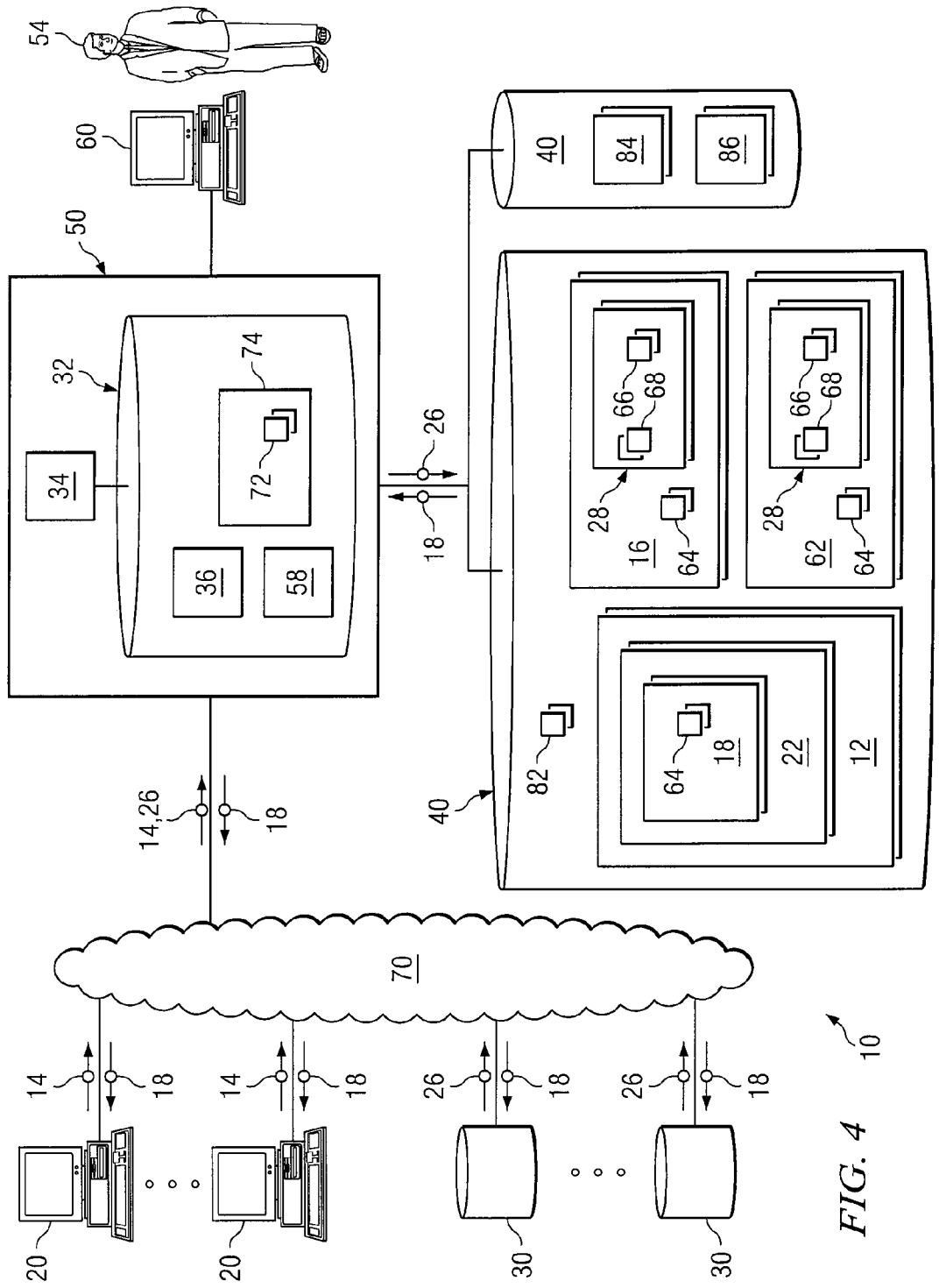
FIG. 4 illustrates a database system, according to certain embodiments.

Database system 10 may, in some embodiments, rebuild secondary indices 16 in conjunction with reorganizing partitioned database 12. In other embodiments, database system 10 may rebuild secondary indices 16 without reorganizing partitioned database 12. FIG. 4 illustrates database system 10 that is operable to rebuild secondary indices 16 associated with partitioned database 12 without reorganizing partitioned database 12. The components of database system 10 illustrated in FIG. 4 are operable to perform the same functions and operations as described with respect to FIG. 1.

During the normal use of partitioned database 12, data records 18 may be added, moved, deleted, and/or updated in partitioned database 12. When data record 18 changes memory location 28 in a particular partition 22, the change may be indicated in an Indirect List Data Set (ILDS) 82 associated with the particular partition 22. To process query 14, database system 10 may scan secondary index 16 to determine the original location of data records 18. Database system 10 may then scan ILDS 82 associated with a particular partition 22 to determine whether data record 18 has been moved and, if so, the new memory location 28 of data record 18. Thus, ILDS 82 represents an intermediary index that may be used in conjunction with secondary index 16 to locate data records 18 that have been moved and/or modified.

Because the scanning of ILDS 82 consumes time and processing resources, it may be desirable to eliminate or reduce the use of ILDS 82. In some embodiments, the use of ILDS 82 may be eliminated or reduced by occasionally rebuilding secondary index 16 to include the current memory locations 28 of data records 18 that have been modified, moved, and/or added. According to certain embodiments, database system 10 may rebuild secondary indices 16 associated with partitioned database 12 without reorganizing partitioned database 12.

In operation, processor 34 may receive from operator 54 a command to rebuild secondary indices 16 associated with a particular partitioned database 12. In response to the received command, processor 34 may temporarily take offline each of the partitions 22 of partitioned database 12. In certain embodiments, all of the partitions 22 of partitioned database 12 may be taken offline at substantially the same time. Processor 34 may then unload each partition 22 into a respective unload file 84 in memory module 40. In some embodiments, unload file 84 represents a temporary file usable to generate primary and/or secondary indices 16. In other embodiments, unload file 84 represents a backup file that may be used to repair or recover all or portions of partitioned database 12.

After unloading partitions 22, processor 34 may reload each partition 22 from its respective unload file 84 back into partitioned database 12. In conjunction with reloading each partition 22 into partitioned database 12, processor 34 may determine the current memory location 28 of each data record 18 in partitioned database 12. Processor 34 may write the determined memory location 28 to an indexing file 86 in memory module 40. Processor 34 may then analyze, sort, aggregate, and/or compile the information in indexing file 86 to generate secondary index 16. Secondary index 16 for a particular secondary DBD 72 may comprise a plurality of entries. Each entry may comprise a respective field value 64 and the particular memory location(s) 28 where the respective field value 64 is located. For example, if secondary index 16 is associated with secondary DBD 72 of "SURNAME_ZIP," a particular entry in secondary index 16 may comprise the field value "Smith_75025" in association with memory location(s) 28 for data record(s) 18 in partitioned database 12 that satisfy query 14 for individual(s) that have a surname of Smith and that reside in the 75025 zip code. Memory information for a particular data record 18 may comprise partition identifier 66 for a particular partition 22 and memory address 68 in the particular partition 22.

In conjunction with reloading partitions 22 into partitioned database 12, processor 34 may generate secondary index 16 for each secondary DBD 72 in secondary DBD file 74. Although the foregoing example illustrates secondary DBD 72 of "SURNAME_ZIP," it should be understood that secondary DBD file 74 may comprise secondary DBDs 72 based on any number, portion, and/or combination of fields. By rebuilding secondary indices 16, database system 10 may reduce the time and resources expended on scanning ILDS 82 to determine current memory location 28 of data record 18.

Database system 10 has several important technical advantages. Various embodiments of the invention may have none, some, or all of these disadvantages. One advantage of the present invention is that it permits the rebuilding of secondary indices 16 for partitioned databases 12. By rebuilding secondary indices 16, database system 10 may reduce the time and resources expended on scanning ILDS 82 to determine current memory locations 28 of data records 18.

Another advantage of the present invention is that it streamlines the process for reorganizing partitioned databases 12. According to traditional methods for online reorganization, systems are required to keep track of when each data record 18 is unloaded and when each update 26 is received. In traditional systems, the time when an update 26 was received must be compared with the time that the corresponding data record 18 was unloaded in order to determine whether the update 26 should be applied to partitioned database 12 or discarded. In contrast, according to certain embodiments of the present invention, processor 34 is able to determine which updates 26 to apply to the partitioned database 12 without comparing the time when each update 26 is received with the time when the corresponding data records 18 are unloaded. Thus, the present invention conserves processing time and resources.

Figure 5:
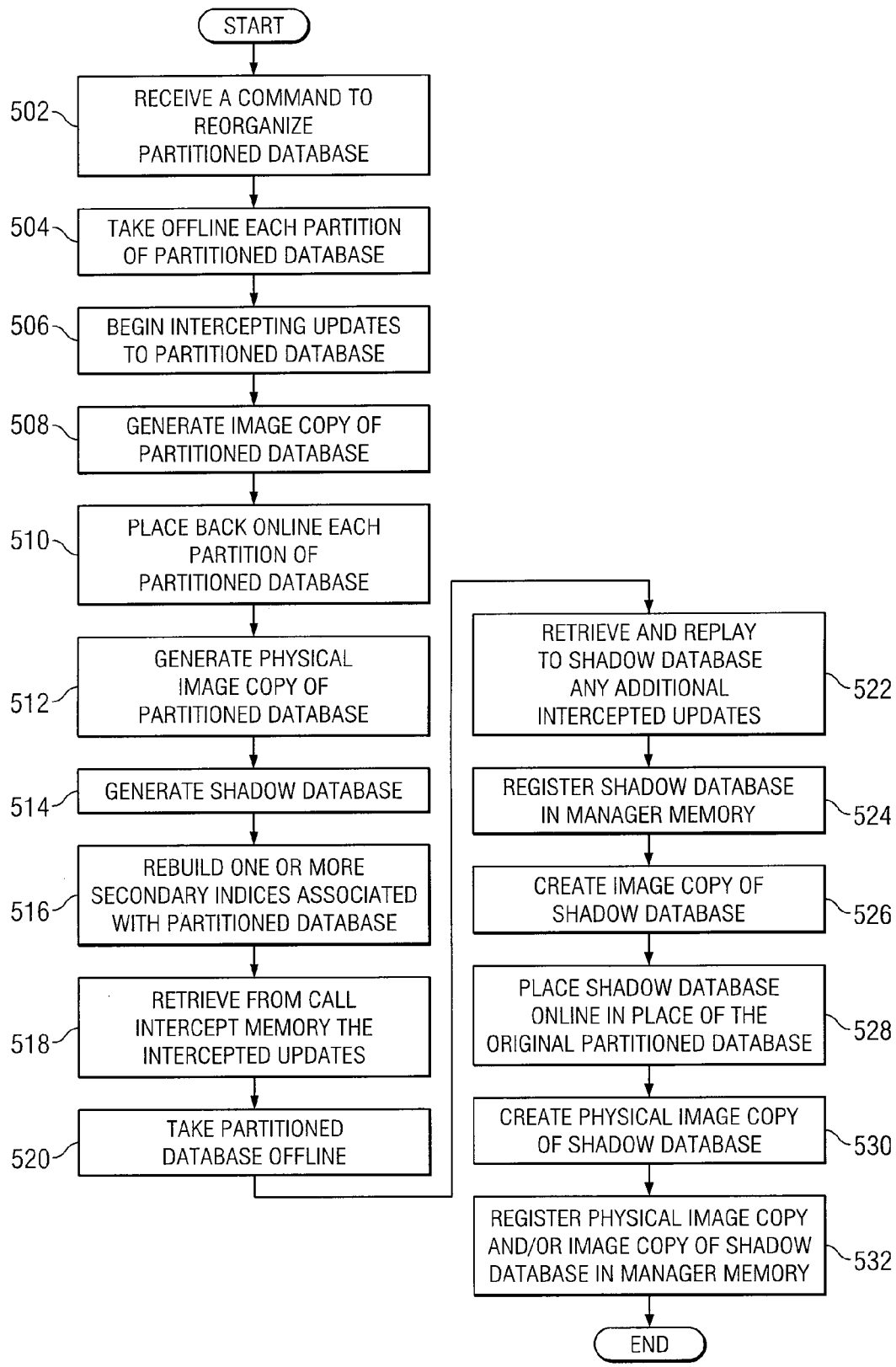
FIG. 5 illustrates a flowchart for rebuilding secondary indices of a partitioned databases, according to certain embodiments.

FIG. 5 illustrates a flowchart for rebuilding secondary indices 16 of partitioned database 12, according to certain embodiments. At step 502, processor 34 receives a command to reorganize a particular partitioned database 12. In some embodiments, the command may be received from operator 54. In other embodiments, manager server 50 may be configured automatically initiate the reorganization of a particular partitioned database 12 based on one or more configurable conditions.

At step 504, processor 34 takes offline each partition 22 of the particular partitioned database 12. At step 506, processor 34 begins intercepting updates 26 to the particular partitioned database 12 from clients 20 and/or data sources 30. Processor 34 continues to intercept updates 26 to the particular partitioned database 12 throughout the reorganization process. Processor 34 stores the intercepted updates 26 in call intercept memory 76.

At step 508, processor 34 uses memory module 40 to generate image copy 24 of the particular partitioned database 12. Processor 34 may store image copy 24 in any suitable number and combination of memory modules 40. At step 510, processor 34 places back online each partition 22 of the particular partitioned database 12. Because the partitioned database 12 is placed back online, the partitioned database 12 may be usable for responding to queries 14 submitted by clients 20 during the reorganization of partitioned database 12.

At step 512, processor 34 generates physical image copy 52 of the particular partitioned database 12. Physical image copy 52 may be stored in memory module 40 and may be usable for recovery purposes in the event partitioned database 12 is damaged or destroyed. At step 514, processor 34 uses image copy 24 and/or physical image copy 52 to generate shadow database 12'. In generating shadow database 12', processor 34 unloads data from image copy 24 and/or physical image copy 52 and organizes the data in shadow database 12'. Thus, shadow database 12' is a more efficient version of the original partitioned database 12. Shadow database 12' may be stored in any suitable number and combination of memory modules 40.

At step 516, processor 34 rebuilds one or more secondary indices 16 associated with partitioned database 12. As data record 18 is loaded from image copy 24 and/or physical image copy 52 into shadow database 12', processor 34 may determine the new memory location 28, in shadow database 12', associated with each data record 18. The new memory location 28 may comprise a partition identifier 66 and a memory address 68. Processor 34 may store the determined partition identifier 66 and memory address 68 in the rebuilt secondary index 16.

At step 518, processor 34 retrieves from call intercept memory 76 the intercepted updates 26 that correspond to the particular partitioned database 12. Processor 34 applies the intercepted updates 26 to shadow database 12'. Processor 34 is operable to determine an appropriate location in shadow database 12' for each update 26. At step 520, processor 34 takes the particular partitioned database 12 offline again. At step 522, processor 34 retrieves and replays to shadow database 12' any additional intercepted updates 26. This second phase of replaying intercepted updates 26 to shadow database 12' may help ensure that all updates 26 received since the beginning of the reorganization process are applied to shadow database 12'. It will be understood that processor 34 may repeat the call replay process any number of times during the reorganization of partitioned database 12.

At step 524, processor 34 registers shadow database 12' in manager memory 32. Registration of shadow database 12' may comprise swapping the naming convention of shadow database 12' with that of the original partitioned database 12. Registration may further comprise storing the name, status, and/or memory location 28 of shadow database 12' in manager memory 32. Thus, shadow database 12' assumes the role of the original partitioned database 12.

At step 526, processor 34 uses memory module 40 to create image copy 24' of shadow database 12'. Image copy 24' of shadow database 12' may be stored in any number and combination of memory modules 40. According to certain embodiments, manager server 50 may use image copy 24' of shadow database 12' for recovery purposes should shadow database 12' become damaged.

At step 528, processor 34 places shadow database 12' online in place of the original partitioned database 12. Because shadow database 12' is a reorganized version of the original partitioned database 12, database system 10 may use shadow database 12' to more efficiently respond to queries 14 from clients 20. At step 530, processor 34 may create physical image copy 52' of shadow database 12'. At step 532, physical image copy 52' and/or image copy 24' of shadow database 12' may be registered in manager memory 32 for recovery purposes. Registration may comprise storing the name, status, and/or memory location 28 of physical image copy 52' and/or image copy 24' of shadow database 12' in manager memory 32. Should shadow database 12' become damaged, manager server 50 may use physical image copy 52' to recover shadow database 12'. In some embodiments, manager server 50 may be operable to use image copy 24' of shadow database 12' to recover shadow database 12'. In such embodiments, it may not be necessary to create physical image copy 52' of shadow database 12'. The method then ends.

Figure 6:
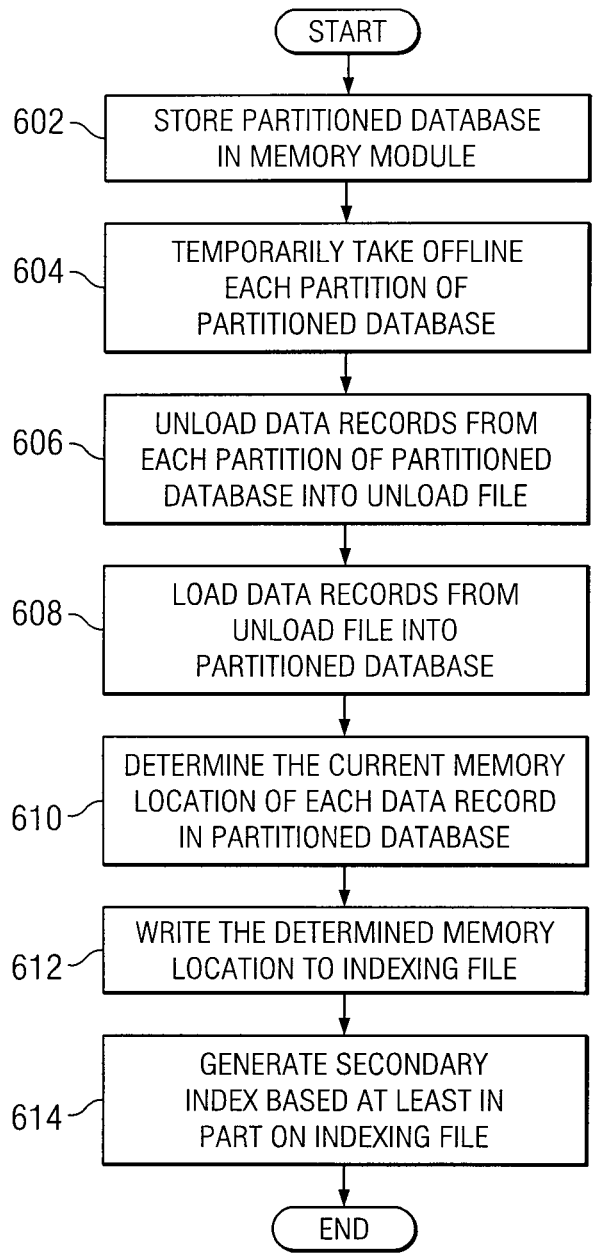
FIG. 6 illustrates a flowchart for rebuilding secondary indices without reorganizing a partitioned database.

FIG. 6 illustrates a flowchart for rebuilding secondary indices 16 without reorganizing partitioned database 12. The method begins at step 602 by storing a partitioned database 12 comprising a plurality of partitions 22. Each partition 22 of partitioned database 12 comprises a respective set of data records 18. At step 604, processor 34 temporarily takes offline each partition 22 of partitioned database 12. In some embodiments, each partition 22 may be taken offline at substantially the same time.

At step 606, processor 34 unloads data records 18 from each partition 22 into unload file 84. At step 608, processor 34 reloads data records 18 from unload file 84 into partitioned database 12. In conjunction with reloading data records 18 into partitioned database 12, processor 34 determines, at step 610, the current memory location 28 of each data record 18 in partitioned database 12. At step 612, processor 34 writes the determined memory location 28 to indexing file 86. At step 614, processor 34 analyzes, sorts, aggregates, and/or compiles the information in indexing file 86 to generate secondary index 16. Each entry in secondary index 16 may comprise a respective field value 64 and the particular memory location(s) 28 where the corresponding data record(s) 18 are located. Memory information for a particular data record 18 may comprise partition identifier 66 for a particular partition 22 in memory module 40 and memory address 68 of the respective data record 18 in the particular partition 22. The method then ends.

Although the present invention has been described in detail, it should be understood the various changes, substitutions, and alterations can be made hereto without departing from the scope of the invention as defined by the appended claims.

What is claimed is:

1. A method, comprising:
    generating a copy of a partitioned database comprising a plurality of partitions, wherein the partitioned database is associated with at least one secondary index;
    loading data records from the copy of the partitioned database into a shadow partitioned database, the data records loaded such that the shadow partitioned database represents a reorganized version of the partitioned database;
    in conjunction with loading the data records into the shadow partitioned database, rebuilding the at least one secondary index, wherein the at least one secondary index is rebuilt by at least one processor, wherein rebuilding the at least one secondary index comprises:
        determining, from the shadow partitioned database, a partition identifier and a memory address associated with a particular data record loaded into the shadow partitioned database; and
        storing the determined partition identifier and the determined memory address in the at least one secondary index; and
    replacing the partitioned database with the shadow partitioned database.

2. The method of claim 1, further comprising:
    prior to generating the copy of the partitioned database, taking offline each of the plurality of partitions.

3. The method of claim 2, further comprising:
    after generating the copy of the partitioned database and prior to loading the data records into the shadow partitioned database, placing each of the plurality of partitions online.

4. The method of claim 1, further comprising:
    in conjunction with generating the shadow partitioned database, receiving at least one update to the partitioned database; and
    prior to replacing the partitioned database with the shadow partitioned database, applying the at least one update to the shadow partitioned database.

5. The method of claim 1, wherein:
    the data records are loaded into the shadow partitioned database while each of the plurality of partitions is accessible to one or more clients of a database system.

6. The method of claim 1, wherein the partitioned database represents a high availability large database (HALDB).

7. The method of claim 1, further comprising:
    receiving an update to the partitioned database;
    determining whether the partitioned database is currently being reorganized; and
    in response to determining that the partitioned database is being reorganized, intercepting and storing the update in an intercept memory.

8. The method of claim 7, further comprising generating a physical image copy of the partitioned database, wherein:
    the physical image copy is based at least in part on the flash image copy; and
    the physical image copy is usable to recover and/or repair the partitioned database.

9. A system, comprising:
    one or more memory modules operable to store a partitioned database comprising a plurality of partitions; and
    a processor communicatively coupled to the one or more memory modules and operable to:
    generate a copy of the partitioned database, wherein the partitioned database is associated with at least one secondary index;
    load data records from the copy of the partitioned database into a shadow partitioned database, the data records loaded such that the shadow partitioned database represents a reorganized version of the partitioned database;
    in conjunction with loading the data records into the shadow partitioned database, rebuild the at least one secondary index by:
        determining, from the shadow partitioned database, a partition identifier and a memory address associated with a particular data record loaded into the shadow partitioned database; and storing the determined partition identifier and the determined memory address in the at least one secondary index; and replace the partitioned database with the shadow partitioned database.

10. The system of claim 9, wherein:

prior to generating the copy of the partitioned database, the processor is further operable to take offline each of the plurality of partitions.

11. The system of claim 10, wherein the processor is further operable to:

after generating the copy of the partitioned database and prior to loading the data records into the shadow partitioned database, place each of the plurality of partitions online.

12. The system of claim 9, wherein the processor is further operable to:

in conjunction with generating the shadow partitioned database, receive at least one update to the partitioned database; and prior to replacing the partitioned database with the shadow partitioned database, apply the at least one update to the shadow partitioned database.

13. The system of claim 9, wherein:

the data records are loaded into the shadow partitioned database while each of the plurality of partitions is accessible to one or more clients of a database system.

14. The system of claim 9, wherein the partitioned database represents a high availability large database (HALDB).

15. The system of claim 9, wherein the processor is further operable to:

receive an update to the partitioned database;

determine whether the partitioned database is currently being reorganized; and in response to determining that the partitioned database is being reorganized, intercept and store the update in an intercept memory.

16. The system of claim 15, further comprising generating a physical image copy of the partitioned database, wherein:

the physical image copy is based at least in part on the flash image copy; and the physical image copy is usable to recover and/or repair the partitioned database.

17. A method, comprising:

storing a partitioned database comprising a plurality of partitions, wherein each of the plurality of partitions comprises a respective set of data records;

storing at least one secondary index associated with each of the plurality of partitions;

taking offline each of the plurality of partitions;

unloading data records from the partitioned database;

loading the data records into the partitioned database;

in conjunction with loading the data records, modifying the at least one secondary index, the modification comprising:

determining a partition identifier and a memory address associated with a particular data record loaded into the partitioned database, the determination performed by at least one processor; and storing the determined partition identifier and the determined memory address in the at least one secondary index; and wherein:

the particular data record comprises a first field value and a second field value; and the at least one secondary index allows the particular data record to be located based on a query that includes a combination of the first field value and the second field value.

18. The method of claim 17, wherein the partitioned database represents a high availability large database (HALDB).

19. The method of claim 17, wherein each of the plurality of partitions are taken offline substantially simultaneously.

20. The method of claim 17, wherein:

the particular data record is loaded into the particular memory address; and the particular memory address is in a partition associated with the determined partition identifier.

21. The method of claim 17, wherein:

the at least one secondary index is based at least in part on the first field value and the second field value.

22. The method of claim 17, wherein:

the particular data record defines a first field and a second field;

the at least one secondary index is a first secondary index that is based at least in part on the first field;

and further comprising:

storing a second secondary index associated with each of the plurality of partitions, wherein the second secondary index is based at least in part on the second field; and in conjunction with loading the data records, rebuilding the second secondary index.

23. The method of claim 2, wherein each of the plurality of partitions are taken offline substantially simultaneously.

24. The system of claim 10, wherein the processor is further operable to take each of the plurality of partitions offline substantially simultaneously.

* * * * *